United States Patent [19]
Rohs et al.

[11] Patent Number: 4,825,692
[45] Date of Patent: May 2, 1989

[54] APPARATUS FOR PRODUCING TORSIONAL VIBRATIONS

[75] Inventors: Ulrich Rohs, Duren; Dieter Voigt, Aachen, both of Fed. Rep. of Germany

[73] Assignee: Brown Bovery AG, Mannheim, Fed. Rep. of Germany

[21] Appl. No.: 127,805

[22] Filed: Dec. 2, 1987

[30] Foreign Application Priority Data

Dec. 3, 1986 [DE] Fed. Rep. of Germany ....... 3641338

[51] Int. Cl.$^4$ ............................................ G01M 19/00
[52] U.S. Cl. .................................... 73/118.1; 73/662; 73/814
[58] Field of Search .................... 73/118.1, 117.3, 116, 73/814, 662, 811, 162; 74/1 SS, 675, 844, DIG. 2; 123/192 R

[56] References Cited

U.S. PATENT DOCUMENTS

| | | | |
|---|---|---|---|
| 3,112,643 | 12/1963 | Lanahan | 73/162 |
| 3,152,468 | 10/1964 | Powell | 74/675 X |
| 3,460,405 | 8/1969 | Simmons | 74/801 |
| 3,754,437 | 8/1973 | Kanbel et al. | 73/811 |
| 4,283,957 | 8/1981 | Zorbrist | 73/814 |
| 4,699,097 | 10/1987 | Tanaka et al. | 123/192 R |

FOREIGN PATENT DOCUMENTS

| | | |
|---|---|---|
| 275375 | 11/1912 | Fed. Rep. of Germany . |
| 1222757 | 8/1965 | Fed. Rep. of Germany . |
| 3424923 | 2/1986 | Fed. Rep. of Germany . |
| 2558552 | 7/1985 | France . |

OTHER PUBLICATIONS

BBC-Nachrichten 65, 1983, Heft 11, pp. 385-392.

*Primary Examiner*—Jerry W. Myracle
*Attorney, Agent, or Firm*—Collard, Roe & Galgano

[57] ABSTRACT

An apparatus for producing predetermined torsional vibrations in a mechanical transmission is disclosed. The apparatus includes a summing gear arrangement including a non-revolving gear member such as of a planetary or differential gear assembly. The summing gear arrangement includes at least three shafts or three gears wherein the non-revolving gear member is rotatably mounted and is connected to a control capable of transmitting impulses corresponding to the torsional vibrations. The summing gear arrangement combines the torsional vibrations with a mechanical input thereto to produce an altered output.

6 Claims, 1 Drawing Sheet

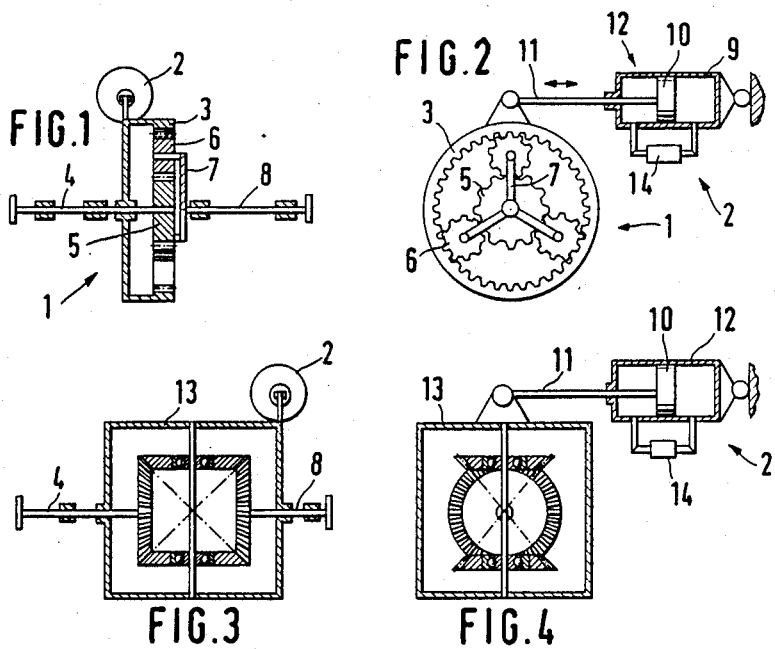
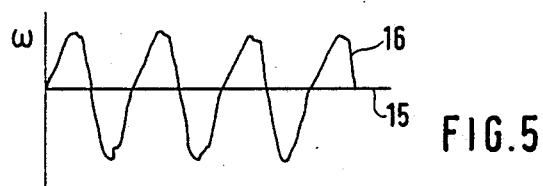
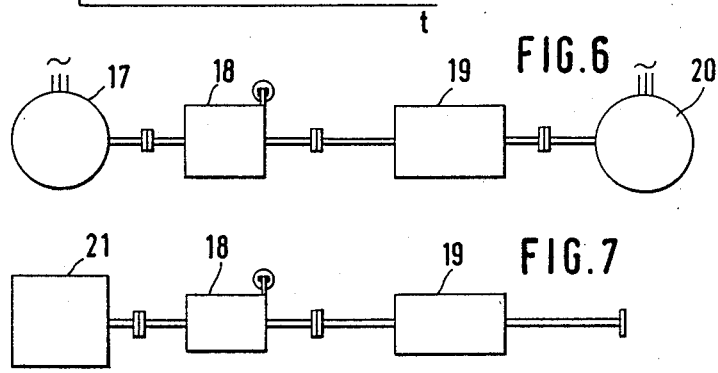

APPARATUS FOR PRODUCING TORSIONAL VIBRATIONS

BACKGROUND OF THE INVENTION

1. Field of the Invention

The invention relates to an apparatus for producing defined torsional vibrations in a mechanical transmission. Specifically, this apparatus is designed to introduce predetermined torsional vibrations into a drive system which vibrations correspond to those produced by a reciprocating combustion engine.

2. Description of the Prior Art

Reciprocating piston internal-combustion engines, under the influence of periodic forces of gases and gravity, inevitably produce torsional vibrations. These torsional vibrations are transferred to or superimposed on downstream, driven components.

Testing is required to develop drive train components that are incorporated into mechanical transmissions, particularly those of motor vehicles powered by reciprocating combustion engines, e.g., transmissions, drive shafts, axle assemblies and the like. This testing requires that the components be subjected for long periods of time to the effects of torsional vibrations produced by the reciprocating combustion engine.

However, using reciprocating combustion engines in this testing results in undesirably high and unrecoverable energy input. Also, the exhaust and noise produced places a heavy stress on the environment.

In the search for drive systems for testing such components that cost less to operate and pose less danger to the environment, first consideration was given to an electrical drive system. With such a test set-up, some of the energy input could be recovered in a generator. However, electric motors produce no usable torsional vibrations. Therefore, a device had to be developed that would act on the drive train in such a way that torsional vibrations would be simulated in the components to be tested. These vibrations had to correspond, as much as possible, to the vibrations normally produced by reciprocating combustion engines.

Conversely, it is equally useful to provide a device for producing torsional vibrations such as a reciprocating combustion engine would produce, and to place this device in a drive train of a reciprocating combustion engine. This device could then be used to compensate for or dampen the torsional vibrations produced by the reciprocating combustion engine.

SUMMARY OF THE INVENTION

The object of the present invention is therefore to provide an apparatus capable of producing defined torsional vibrations in a mechanical transmission in a predetermined, precise form and with a controlled amplitude.

It is a further object of this invention to provide an apparatus which can simulate the vibrations produced by a reciprocating internal-combustion engine to be used in testing transmission components. It is yet an additional object of the invention to provide an apparatus which can compensate or dampen the torsional vibrations produced by a reciprocating combustion engine.

Accordingly, these objects are accomplished pursuant to the invention by means of an apparatus for producing defined torsional vibrations in a mechanical transmission. The apparatus includes a non-revolving gear member of a mechanical summing gear system which may be a differential or a planetary gear system, and includes at least three shafts or three gears. The nonrevolving gear member is mounted for at least limited rotation and is connected to a control element capable of transmitting impulses corresponding to the torsional vibrations of a reciprocating engine. The control signal for the control element can be programmed so that it introduces into the summing gear system the torsional vibrations typically produced by a reciprocating combustion engine. Hence, the device pursuant to the invention is useful for both testing and compensating purposes.

Other objects and features of the present invention will become apparent from the following detailed description considered in connection with the accompanying drawing, which discloses two embodiments of the invention. It is to be understood that the drawing is to be used for purpose of illustration only, and not as a definition of the limits of the invention.

BRIEF DESCRIPTION OF THE DRAWING

In the drawing, wherein similar reference characters denote similar elements throughout the several views:

FIG. 1 is a schematic top view, partly in cross-section, of an apparatus pursuant to the invention with a planetary gear;

FIG. 2 is a side elevation view of FIG. 1;

FIG. 3 is a schematic top view of an apparatus pursuant to the invention with a differential gear;

FIG. 4 is a side elevation view of FIG. 3;

FIG. 5 is a graphic representation of the pattern of torsional vibration with reciprocating combustion engines and with electric motors;

FIG. 6 is a block diagram of an experimental arrangement for determining the behavior of components under torsional vibration using an electric drive; and FIG. 7 is a block diagram of the drive train of a reciprocating combustion engine including the device pursuant to the invention for compensating for torsional vibration.

DESCRIPTION OF THE PREFERRED EMBODIMENTS

Referring to FIGS. 1 and 2, there is shown a first embodiment of an apparatus for producing defined torsional vibrations in a mechanical transmission.

The device consists of a summing gear arrangement generally denoted as 1. This gear arrangement comprises a non-revolving gear and at least three gears or three shafts and a control element 2 operatively coupled to the summing gear arrangement 1. The summing gear arrangement shown in FIGS. 1 and 2 is a planetary gear with a ring gear 3, normally stationary but here rotatably mounted on a drive shaft 4. A sun gear 5 is connected to and revolves with drive shaft 4 and planet gear 6 is mounted on a planetary carrier 7. Planetary carrier 7 is rigidly connected with the power take-off shaft 8 and rotates along with it. This arrangement allows the vibrational input to ring gear 3 to be added to the input from drive shaft 4 to produce the desired output on shaft 8.

Referring to FIG. 2, there is shown the details of control element 2 which includes a servomechanism 12 operated by a pneumatic or hydraulic medium and a cylinder 9 in which a piston 10 travels. Piston 10 is coupled at joint 1 via a piston rod 11 to the non-revolving gear member, i.e., in this instance the rotatably mounted ring gear 3 of summing gear arrangement 1.

The cylinder spaces on either side of piston 10 of servomechanism 12 are connected with a device 14 that produces a flow of a pressurized medium which drives piston 10. This flow is controlled by an electrical signal to act on and adjust piston 10 of control element 2 by impulses corresponding to the pre-defined torsional vibrations. These impulses produce the predetermined torsional vibration in summing gear arrangement 1, e.g., like those produced by a reciprocating combustion engine. Instead of sliding piston 10, servomechanism 12 can also have a rotary piston as an adjusting member (not shown).

Referring to FIGS. 3 and 4, there is shown a second embodiment of the invention that uses a differential gear in the summing gear instead of a planetary gear. Where the parts are structurally the same as in the description of the foregoing embodiment, the same reference numbers have been used.

In this embodiment, control element 2 is connected to the non-revolving housing 13. Housing 13 constitutes the gear member which receives the torsional vibration impulses produced by control element 2. Again, the vibrational input is added to the input of shaft 4 to produce the desired output of shaft 8.

Referring to FIG. 5, there is shown, in graph form, the torsional vibration behavior at the power take-off from a reciprocating combustion engine and from an electric motor. An electric motor produces no torsional vibrations but revolves steadily. This is shown by curve 15, which parallels the abscissa (constant torsional output with time). Curve 16, on the other hand, depicts the characteristic torsional vibrations from a reciprocating combustion engine.

Referring to FIG. 6, there is shown a schematic block diagram of an experimental set-up for studying the torsional vibration behavior of components, even while they are being driven by an electric motor 17. This power train has a device 18 pursuant to the invention connected after electric motor 17 for producing defined torsional vibrations. The torsional vibrations produced in this situation are the same as would be produced if a reciprocating combustion engine were used. The components 19 to be tested such as transmission, drive shaft, axle assembly or the like are connected downstream of device 18. An electric generator 20 is connected to the output of these components to recover some of the drive energy.

This experimental set-up provides a method for environmentally safe testing of drive system components under largely uniform operating conditions.

Referring to FIG. 7, there is shown a block diagram of a power train driven by a reciprocating combustion engine 21 in which the engine is followed by device 18 pursuant to the present invention. The power take-off of the compensating device is connected to the usual components 19.

Device 18 in this situation is controlled, e.g., by phase displacement or inversion, in such a way that the torsional vibrations coming from reciprocating combustion engine 21 are largely compensated for or altered.

While only two examples and embodiments of the present invention have been shown and described, it is obvious that many changes and modifications may be made thereunto without departing from the spirit and scope of the invention.

What is claimed is:

1. An apparatus for simulating the torque curve of an internal combustion engine by adding predetermined torsional vibrations to an input torque, said apparatus comprising:

an input shaft transmitting the input torque;

a summing gear arrangement mounted on said input shaft for combining mechanical inputs having a non-revolving gear member mounted for partial rotation with respect to said input shaft;

revolving gear means coupled between said input shaft and said non-revolving gear member, said revolving gear means receiving the input torque therefrom;

an output shaft coupled to said revolving gear means; and a servomechanism operated by a fluid means coupled to said non-revolving gear member, said servomechanism causing pre-defined oscillating rotation of said non-revolving gear member thereby transmitting vibration impulses thereto, which impulses are amplified by said revolving gear means to produce the predetermined torsional vibrations being added to said input torque and transferred onto said output shaft.

2. An apparatus as set forth in claim 1 wherein said servomechanism includes an electrical control device coupled to said servomechanism and connected on the drive side thereof for producing pressure impulses corresponding to the torsional vibrations, said fluid means is a fluid cylinder connected to said non-revolving gear member of said summing gear arrangement whereby said pressure impulses cause said rotational movement of said non-revolving gear.

3. An apparatus device as set forth in claim 1 wherein said fluid means is a rotary piston.

4. An apparatus as set forth in claim 1 wherein said fluid means is a slide piston and is linked by a joint to said non-revolving gear member.

5. An apparatus as set forth in claim 1 further including an electric motor connected to said input shaft and a drive train connected to said output shaft of said summing gear arrangement whereby said predetermined torsional vibrations are passed into the downstream components of said drive train.

6. An apparatus as set forth in claim 1 further including a reciprocating combustion engine connected to said input shaft and a drive train connected to said output shaft of said summing gear arrangement wherein said predetermined torsional vibrations produced compensate for the torsional vibrations produced by said reciprocating combustion engine.

* * * * *

UNITED STATES PATENT AND TRADEMARK OFFICE
CERTIFICATE OF CORRECTION

PATENT NO.    : 4,825,692
DATED         : MAY 2, 1989
INVENTOR(S)   : ULRICH ROHS, DIETER VOIGT

It is certified that error appears in the above-identified patent and that said Letters Patent is hereby corrected as shown below:

Cover page, item [73], delete "Brown Bovery AG" and substitute therefor --BBC Brown Boveri Aktiengesellschaft--.

Signed and Sealed this

Twenty-fourth Day of April, 1990

Attest:

HARRY F. MANBECK, JR.

*Attesting Officer*  *Commissioner of Patents and Trademarks*